United States Patent
Hambrick et al.

(10) Patent No.: US 8,024,733 B2
(45) Date of Patent: Sep. 20, 2011

(54) COMPONENT MODEL FOR BATCH COMPUTING IN A DISTRIBUTED OBJECT ENVIRONMENT

(75) Inventors: Geoffrey Martin Hambrick, Round Rock, TX (US); Robert Howard High, Jr., Round Rock, TX (US); Rodney Alan Little, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1616 days.

(21) Appl. No.: 10/845,544

(22) Filed: May 13, 2004

(65) Prior Publication Data

US 2005/0256826 A1 Nov. 17, 2005

(51) Int. Cl.
*G06F 9/46* (2006.01)
(52) U.S. Cl. ...................................... 718/101
(58) Field of Classification Search ............ 718/101; 714/15
See application file for complete search history.

(56) References Cited

U.S. PATENT DOCUMENTS 6,577,597 B1 * 6/2003 Natarajan et al. ............. 370/232
6,742,015 B1 * 5/2004 Bowman-Amuah .......... 718/101
6,834,358 B2 * 12/2004 Korenevsky et al. ........... 714/15

OTHER PUBLICATIONS

Goo et al., "A Java Distributed Batch Processing System Using Network of Workstations", Comput. Pract. (South Korea) vol. 5, No. 5, Oct. 1999, pp. 583-584.
Musich, Automating Batch Processing (Platinum Technology's AutoSys/JobVision Add-On), PC Week, 3, 16, Jan. 18, 1999 / 101(1).
Olsen, Schedulers Work the Os Shift; Unix and NT Job Scheduling Software Acts Like a Mainframe Batch Controller (Platinum Technology's AutoSys, ISA's AppWorx), Government Computer News, n11, v15, May 27, 1996, p. 49(2).
http://www.advsyscon.com/products/activebatch/activebatch.asp?mode=description, "ActiveBatch Enterprise Job Scheduling and Management", Jan. 6, 2004, pp. 1-6.

* cited by examiner

*Primary Examiner* — Meng A An
*Assistant Examiner* — Eric C Wai
(74) *Attorney, Agent, or Firm* — Yee & Associates, P.C.; Justin M. Dillon

(57) ABSTRACT

A batch component model is provided within a distributed object environment. The batch component is designed to capture the iterative logic of a batch program as it reads from one or more input streams, invokes operations on other business component functions, and generates output to one or more output streams. Deployment descriptors express declarative policies for the component that will influence how the component is managed including the streams it uses, business components it depends on, how processing costs are accounted, and the resource demands the job will put on the system. Input streams and output streams are encapsulated in objects that hide the actual source of input and output data so that the component can be redeployed in different execution environments to different physical data sources without requiring the program to be changed. A batch container enforces the deployment policies declared for the batch component.

59 Claims, 8 Drawing Sheets

COMPONENT MODEL FOR BATCH COMPUTING IN A DISTRIBUTED OBJECT ENVIRONMENT

BACKGROUND OF THE INVENTION

1. Technical Field

The present invention relates to data processing systems and, in particular, to batch processing in a distributed object environment. Still more particularly, the present invention provides a component model for batch computing in a distributed object environment.

2. Description of Related Art

Distributed object component technology has evolved to provide a solid foundation for modern business application design in online transaction processing systems. These component technologies include, for example, the use of the JAVA programming language, the JAVA 2 Enterprise Edition (J2EE) programming model, and component technologies, such as Java Server Pages (JSPs), Servlets, and Portlets for online presentation logic. Component technologies also includes, for example, the use of Enterprise JAVA Bean (EJB) SessionBeans and EntityBeans for transactional business logic and data management.

These component models are expressly designed to enable a strong separation of concerns between business application logic and the underlying information systems technology on which those application components are hosted. This separation enables application developers to focus on domain knowledge, adding value to their business, and to avoid the intricacies of distributed information systems technology. The EJB component models are designed to support transactional processing of business functions, leveraging the ACID (Atomicity, Consistency, Isolation, and Durability) properties of distributed two-phase commit protocols to ensure a very high degree of information integrity. Further, these component models enable declarative approaches to enforcing security, the relationships between objects, internationalization, serviceability, and persistence, essentially virtualizing the relationship of the business application component to its underlying information system.

The primary limitation of object component technologies, such as those defined by J2EE, is that they are designed for online transaction processing. Business transactions are typically initiated by an end user in real time, requesting that a function be performed by the business application, usually resulting in an update to business data that gets transactionally committed before returning a result to the user. Component models and container management are designed to operate on one request at a time. Any multi-processing is achieved through multi-threading and workload clustering, but in a way that retains the illusion of sequential processing. Transaction, security, and persistence processing are structured around the idea that each request is initiated distinctly for a unique user and for a unique end purpose.

However, there is a large demand for bulk (batch) processing. Besides being a traditional approach to data processing—in fact, the incumbent of modern electronic computing—bulk processing also represents a significant portion of how enterprises continue to conduct their business. Bank checks are processed in bulk in clearing centers every night. Interest on savings and loan accounts is computed in bulk every week. Billing statements are printed in bulk every month. Corporate payments are collected up and posted every week. Paychecks are cut and distributed every couple of weeks. Customers often want to be able to execute these transactions in batch programs, processing many hundreds, thousands, or even millions of transactions in a single job. Moreover, many customers want to be able to re-use the exact same business logic and programming artifacts in both their online transaction processing and in their batch programs. For example, an account withdrawal function should do the same thing whether it is being performed for a bank customer standing at an automatic teller machine or for a check that was posted through a clearing house in the middle of the night.

Batch computing has been a long-time staple of mainframe computing in languages, such as COBOL and PL/I, and as standalone programs or combined in subsystems, such as CICS and IMS. However, batch computing has never been combined with distributed object component technologies. Therefore, one must perform batch processing by stringing together a large number of single transactions, which is inefficient, or by performing one large transaction, which will likely affect online processing.

SUMMARY OF THE INVENTION

The present invention recognizes the disadvantages of the prior art and introduces a batch component model that adopts the same design principles of other J2EE components, but applies them uniquely to batch processing. The batch component is designed to capture the iterative logic of a batch program as it reads from one or more input streams, invokes operations on other business component functions, and generates output to one or more output streams. Deployment descriptors may be associated with the component. Deployment descriptors express declarative policies for the component that will influence how the component is managed including the streams it uses, business components it depends on, how processing costs are accounted for, the resource demands the job will put on the system, and the like. Input streams and output streams are encapsulated in objects that hide the actual source of input and output data so that the component can be redeployed in different execution environments to different physical data sources without requiring the program be changed. A contractual relationship is formed between the batch component and a container that enforces the deployment policies declared for the component, against a set of service qualities offered by the container, including enforcing security, internationalization, and serviceability policies, optimizing the execution path of the batch job, and managing the workload of the batch component against other workloads being served in the execution environment at the same time. Control is passed between the component and its container so that the container binds the component's input and output streams and other dependent business components, optimizes the checkpoint interval, and recovers and restarts the batch job after a failure. The contractual relationship between the batch component and the container is wrappered with a batch adapter to isolate the batch component from different potential container implementations. The adapter may be instantiated to hold the execution progress state of each run of the batch job. In certain cases it is possible for the container to partition the input stream and run multiple (sub-) instances of the batch job in parallel, each operating on its own partition of the input stream to gain even further throughput advantages for the batch workload.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
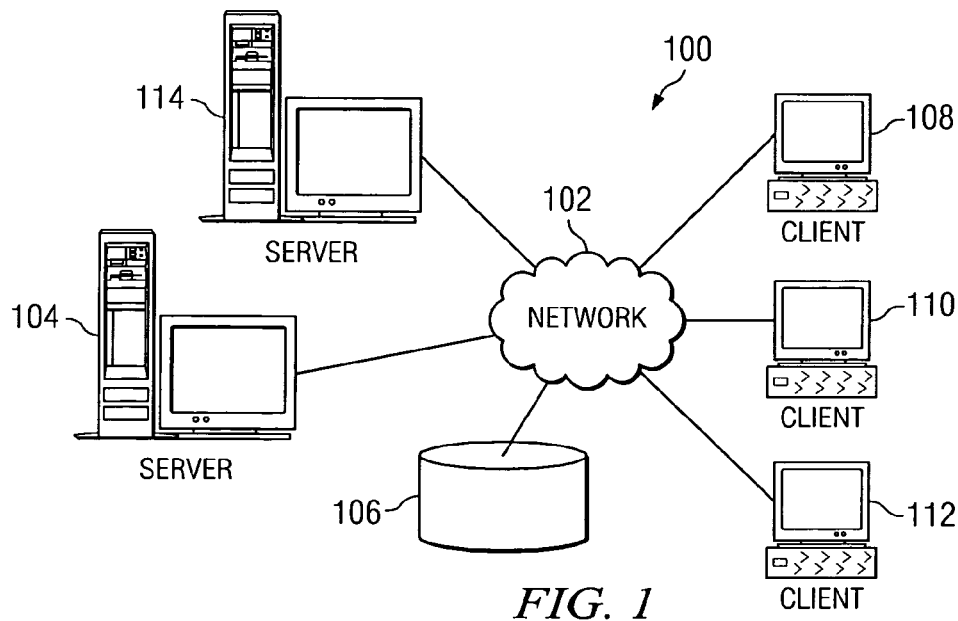
FIG. 1 depicts a pictorial representation of a network of data processing systems in which the present invention may be implemented.
Figure 2:
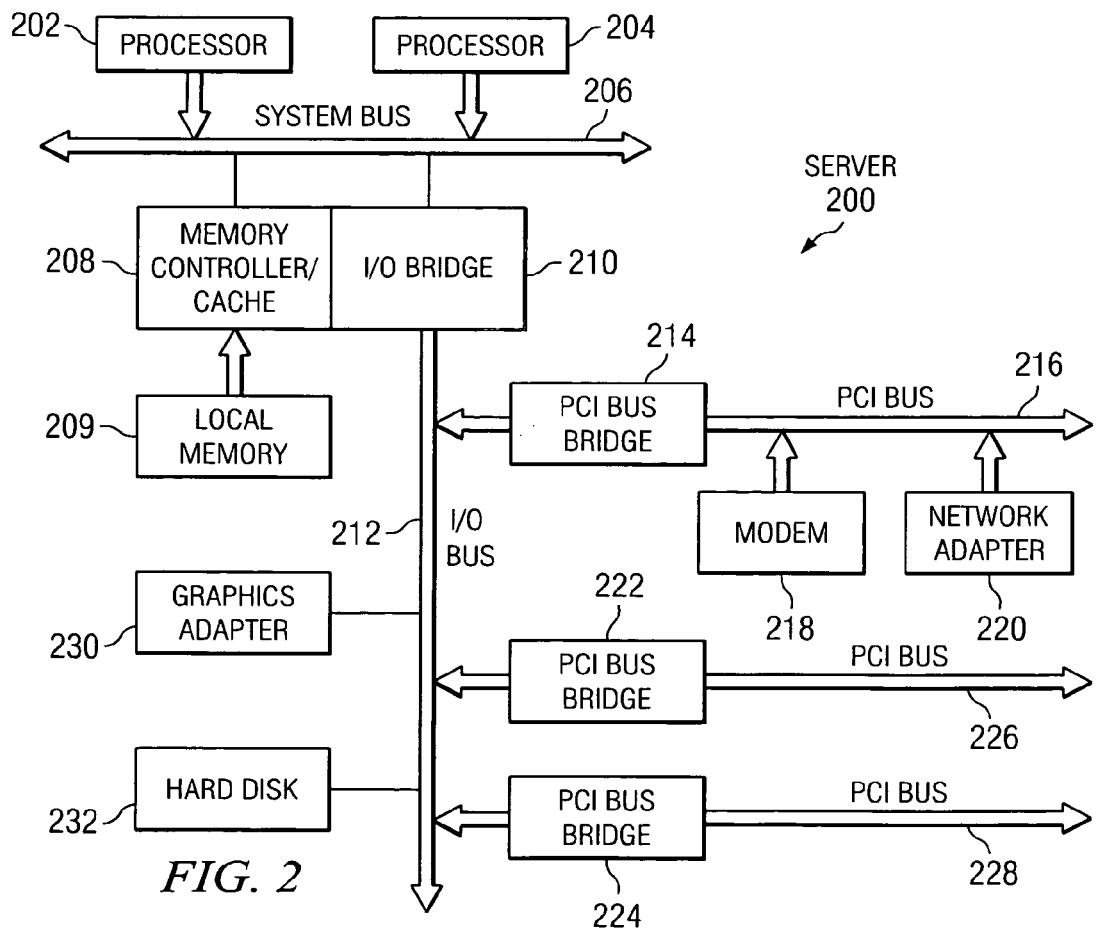
FIG. 2 is a block diagram of a data processing system that may be implemented as a server in accordance with a preferred embodiment of the present invention.
Figure 3:
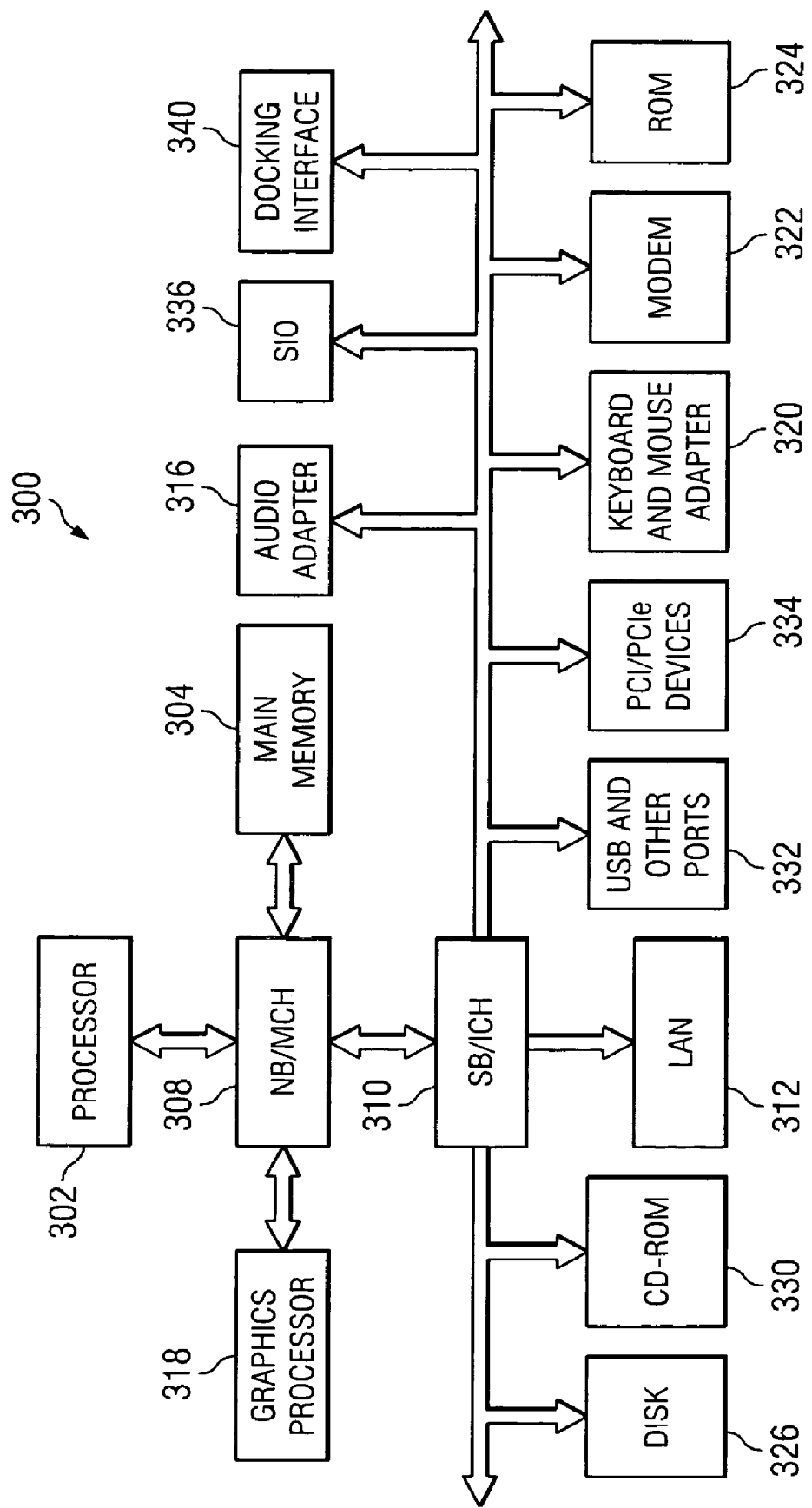
FIG. 3 is a block diagram of a data processing system in which the present invention may be implemented.

The present invention provides a method, apparatus and computer program product for application design based on diagram specialization. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 114 are connected to network 102 along with storage unit 106. In addition, clients 108, 110, and 112 are connected to network 102. These clients 108, 110, and 112 may be, for example, personal computers or network computers. In the depicted example, servers 104, 114 provide data, such as boot files, operating system images, and applications to clients 108-112. Clients 108, 110, and 112 are clients to servers 104, 114. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Returning to FIG. 1, Network data processing system 100 may provide a distributed object environment. For example, server 104 may provide terminal services and other clients, server 114 may provide web services clients, and storage 106 may store core business functions and persistent business objects. Distributed objects are software modules that are designed to work together, but may reside in multiple computer systems throughout the network. A program in one machine sends a message to an object in a remote machine to perform some processing and the results are sent back to the calling machine. Distributed objects over the Web are known as "Web services." "Terminal services" enable an application to be run simultaneously by multiple users at different clients. Terminal services turn a server into a centralized, timeshared computer. All the data processing (business logic) is performed in the server, and the clients display only the user interface and screen changes.

Figure 4:
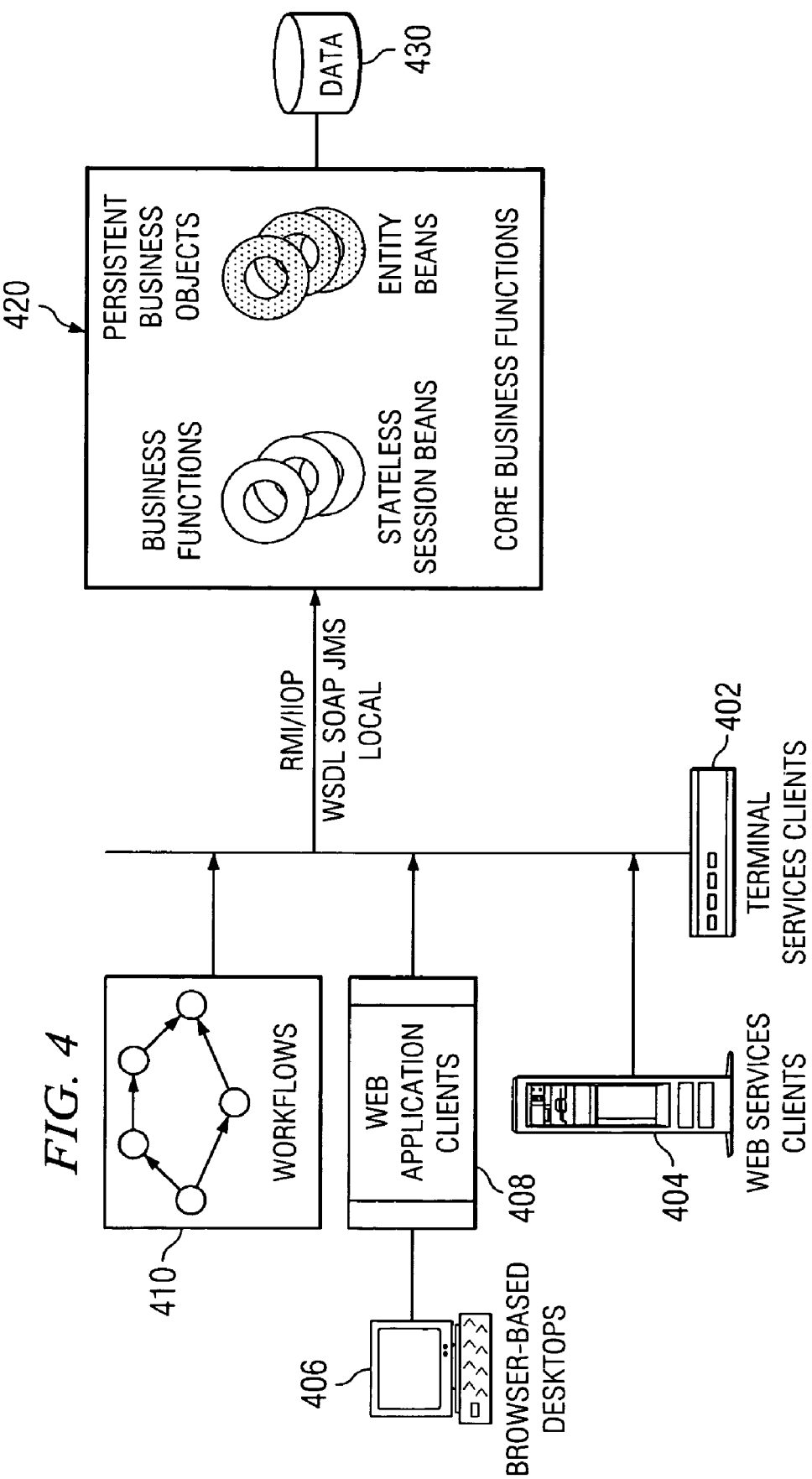
FIG. 4 illustrates an example of an online transaction program in which the present invention may be implemented.

FIG. 4 illustrates an example of an online transaction program in which the present invention may be implemented. The online transaction program may be implemented in J2EE as a combination of SessionBeans and EntityBeans. Core business functions 420 include business functions, which may be stateless SessionBeans, and persistent business objects, which may be EntityBeans. A SessionBean captures the functional logic of the business application, and an EntityBean captures the essential state of the business objects on which business functions operate. EntityBeans basically wrapper the persistence model for the essential state they contain. The preferred approach for using EntityBeans is with container-managed persistence—that is, delegating the management of the EntityBean's essential state to the container on which the bean is hosted. Business functions then may be invoked by a variety of clients, including terminal services clients 402, Web services clients 404, browser-based desktops 406 and Web application clients 408, workflows 410, to name a few.

A "workflow" is a script, or a series of steps to be executed to perform a procedure. A workflow engine (not shown) invokes the tasks or activities that have been scripted into the workflow. These steps typically involve performing transactions using business functions 420.

Data 430 represents persistence of the essential state of the business logic. Persistent data, such as database tables and the like, are stored in data 430.

Clients 402-410 may access core business functions 420 through, for example, Remote Method Invocation over Internet Inter-ORB Protocol (RMI/IIOP), Web Services Description Language (WSDL), Simple Object Access Protocol (SOAP), JAVA Messaging Service (JMS), or local access. RMI/IIOP allows Java access to non-Java processes via Common Object Request Broker Architecture (CORBA). WSDL is a protocol for a Web service to describe its capabilities. SOAP is a message-based protocol based on extensible Markup Language (XML) for accessing services on the Web. JMS is an application programming interface (API) from Sun for connecting JAVA programs to messaging middleware. JMS is part of Sun's J2EE platform.

The primary limitation of object component technologies, as described above with respect to FIG. 4, is that they are designed for online transaction processing. Yet, there is a large demand for batch processing. However, batch computing has never been combined with distributed object component technologies. A convergence between batch computing and distributed object component technologies can yield the combined strength of container based component management, developer productivity, and economies of scale.

The idea of batch computing in a distributed component system introduces several problems, including:

Capturing the same separation of concerns between business logic and information system infrastructure that are the principle merits of component-based programming;

Ensuring the full encapsulation of input and output data sources that is essential to enabling component portability, but is unique to the problem of batch computing;

Reservation of bandwidth and execution resources needed to ensure optimal execution of bulk processing;

Managing the batch processing workload to ensure continuous service of concurrent online transaction processing workloads;

Sharing of the exact same business logic and data components between batch and online transaction processing;

Isolation of checkpoint conditions so that the checkpoint interval can be varied from one run to the next or even within the life of a single run based on the actual workload conditions of the hosting environment, including concurrent utilization of the underlying resources by other batch programs and online transaction processing;

Enabling the batch program to resume at the last checkpoint in the overall job after recovering from a failure in a previous run;

Allowing an administrator to query the progress of the batch program, and perform operations on the batch program to start the program, prematurely interrupt the program, recover the program from any failures, and subsequently restart the program;

Be able to define relationships between batch components so that one batch job can be scheduled after another has completed or progressed a certain amount, and to interconnect the batch components so that the output of one batch job can become the input to another batch job.

Figure 5:
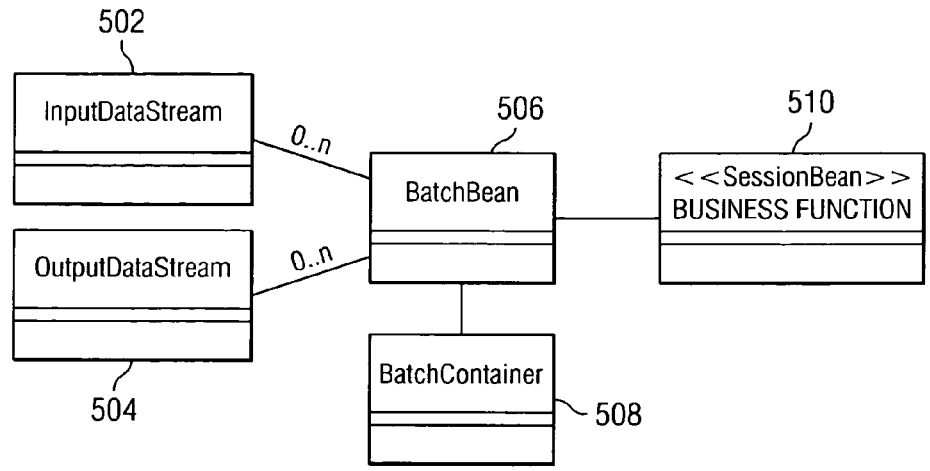
FIG. 5 illustrates an object design for a batch component model for use in batch processing in a distributed object environment in accordance with an exemplary embodiment of the present invention.

FIG. 5 illustrates a configuration of software components for use in batch processing in a distributed object environment in accordance with an exemplary embodiment of the present invention. The present invention introduces a BatchBean component 506. A BatchBean is a business component, much like a SessionBean, perhaps even a specialization of a SessionBean. A BatchBean, like other business components, can be managed by a container, such as BatchContainer 508. A BatchBean can be invoked by other clients, and is also a client to other business components. When the BatchBean is instantiated, it is initialized with zero or more InputDataStreams 502 and zero or more OutputDataStreams 504, and an instance of a BatchContainer 508 that represents a specific instance of a batch job.

Container technology is designed to operate on deployment descriptors (declarative policies) to enforce the policies they express. Containers have been extended to optimize the management of those components to reach optimal throughput in a fully loaded system. This results in application designs that are more flexible, durable, and portable. Componentization enables a higher degree of re-use and sharing of application logic and data, thus improving developer productivity and business process integration. In addition, containers manage components to enforce the contractual obligations of that component model for the business logic they contain.

The BatchBean is attributed with deployment descriptors that provide input to how a BatchBean is managed by its container. Deployment descriptors are supplied as declarative policies for the component by the component assembler and/or deployer. Among the deployment descriptors include descriptors that identify which business function components, such as business function 510 in FIG. 5, the BatchBean uses. The deployment descriptors may be symbolic references that can be coded into the BatchBean implementation, and then bound to the actual components it will use at deployment time. The BatchBean deployment descriptors also refer to the input and output data streams that the BatchBean will be associated with at runtime. These deployment descriptors also name the batch program, conditions the checkpoint interval for the batch job, and enumerates other resource dependencies that should be allocated before beginning the batch job. These descriptors are used by the container that will host the BatchBean when it instantiates a batch job.

The input and output streams 502, 504 presented to the BatchBean component model are abstractions of the actual underlying data technology from which those streams receive their data. Input stream 502, for example, may be a wrapper to a magnetic tape, a message queue, a text file, a relational database table, or any other stream implementation, and thus different underlying data technologies and sources may be bound at deployment time without affecting the implementation of the BatchBean.

Figure 6:
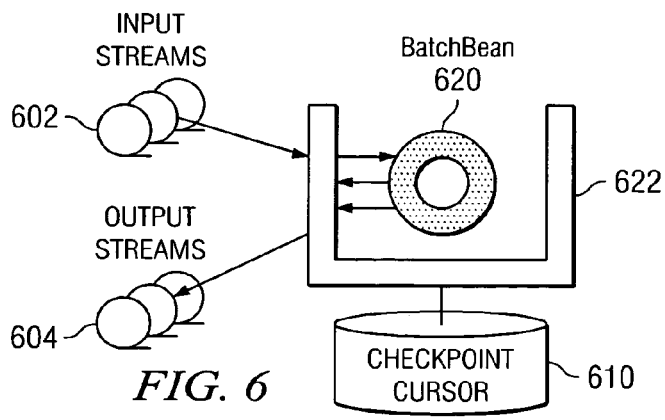
FIG. 6 is a block diagram illustrating a batch component model in accordance with an exemplary embodiment of the present invention.

Turning now to FIG. 6, a block diagram illustrating a batch component model is shown in accordance with an exemplary embodiment of the present invention. Batch component, or BatchBean, 620 is managed by batch container 622. The batch component 620 is attributed with deployment descriptors that provide input to how the batch component is managed by its container. The deployment descriptors also refer to the input streams 602 and output streams 604 that the batch component will be associated with at runtime.

In many cases, an input stream for a batch job may contain many thousands or millions of input records, each record representing an input to a business transaction. Container 622 is responsible for checkpointing the progress of the batch job periodically to ensure that if the job should fail the batch job will not have to be restarted from the beginning, but rather can be restarted at its last checkpoint after recovering from the failure. This includes persisting in checkpoint cursor storage 610 any cursors that mark the progress of the batch job through its input and output streams.

The basic protocol is that container 622 opens a global transaction context at the beginning of a checkpoint interval (the period between checkpoints), lets the batch program iterate over some number of records in its input stream, and then commits the global transaction at the end of the checkpoint interval—committing any business data that was updated during the checkpoint interval along with checkpoint cursors.

If the global transaction cannot be committed, then all of the work that was performed within the checkpoint interval is rolled back. The job is effectively rolled back to the prior checkpoint.

By putting the responsibility of checkpointing on the container, the checkpoint interval can be varied based on other conditions in the execution environment. Increasing the size of the checkpoint interval will tend to maximize the number of business transactions that can be processed in a given period of time. However, doing so tends to leave resources allocated to the batch job for a longer period of time, which blocks other concurrent resources that need to share those same resources, and increases the number of records that need to be re-processed in the case of a failure. On the other hand, decreasing the size of the checkpoint interval decreases the length of contention on shared resources, reduces the number of records that need to be re-processed in the case of failure, but also tends to increase the amount of overhead spent in processing global transaction commitments.

Checkpoint intervals may be measured in terms of the number of records processed in the interval or the amount of time spent in the interval. The container may increase the interval when resource contention from other workloads is low or decrease the interval when contention is high or when there is an elevated potential for the job to fail and have to be restarted.

Figure 7:
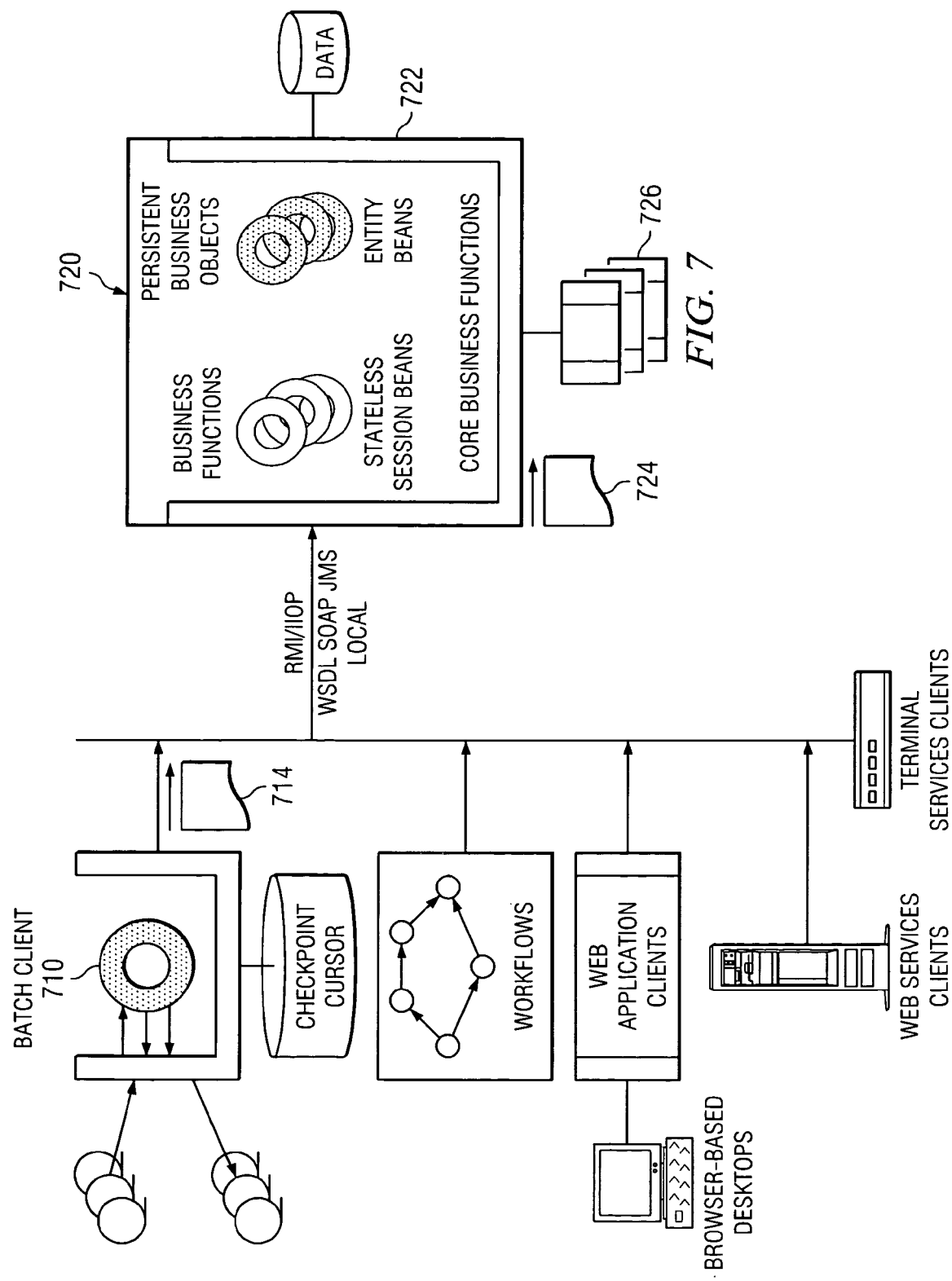
FIG. 7 is a block diagram illustrating a batch component model used within a distributed object environment in accordance with an exemplary embodiment of the present invention.

FIG. 7 is a block diagram illustrating a batch component model used within a distributed object environment in accordance with an exemplary embodiment of the present invention. The distributed object environment may be implemented in J2EE as a combination of SessionBeans and EntityBeans. Core business functions 720 include business functions, which may be stateless SessionBeans, and persistent business objects, which may be EntityBeans. Container 722 operates on deployment descriptors for core business functions 720 to enforce the policies they express.

Batch client 710 is attributed with deployment descriptors that provide input to how the batch component is managed by its container. The deployment descriptors also refer to the input streams and output streams that the batch component will be associated with at runtime. The container in batch client 710 is responsible checkpointing the progress of the batch job periodically to ensure that if the job should fail, the batch job will not have to be restarted from the beginning, but rather can be restarted at its last checkpoint after recovering from the failure. This includes persisting in a checkpoint cursor storage any cursors that mark the progress of the batch job through its input and output streams.

Batch client 710 accesses the same core business functions 720 as the other clients in the distributed object environment. Data 730 represents persistence of the essential state of the business logic. Resources, such as database tables and the like, are stored in data 730. This is germane to potential optimization benefits that can come from knowledge of the checkpoint interval in the container.

A major additional advantage that stems from putting the responsibility for setting the checkpoint interval on the container is that it can then propagate context information 714 and 724 about the size of the checkpoint interval and other information about the dependencies declared for the batch job to downstream containers within an execution context. This context information 714, 724 can then be used by downstream containers to pre-allocate resources or verify that availability of dependent resources that will be used during the checkpoint interval. For example, a downstream EntityBean container 722 can pre-fetch the database rows that will be used in the interval and thus reduce incremental I/O overhead. Or the container may set aside space in object pools, thread pools, connection pools, etc. that will be needed during the interval. Doing so both reduces overhead, making the processing during the checkpoint interval more efficient, but also helps ensure resources that will be needed during the interval will not be depleted before the interval completes, avoiding unnecessary checkpoint failures and thus unnecessary rework.

In more advanced systems, context information can be correlated against applicable application profiles that condition the enforcement of different deployment policies 726 for components used in the batch job. For example, a downstream component may be deployed with container management policies that are unique to the case that the component is being used within a batch program as opposed to some other OLTP client.

Figure 8:
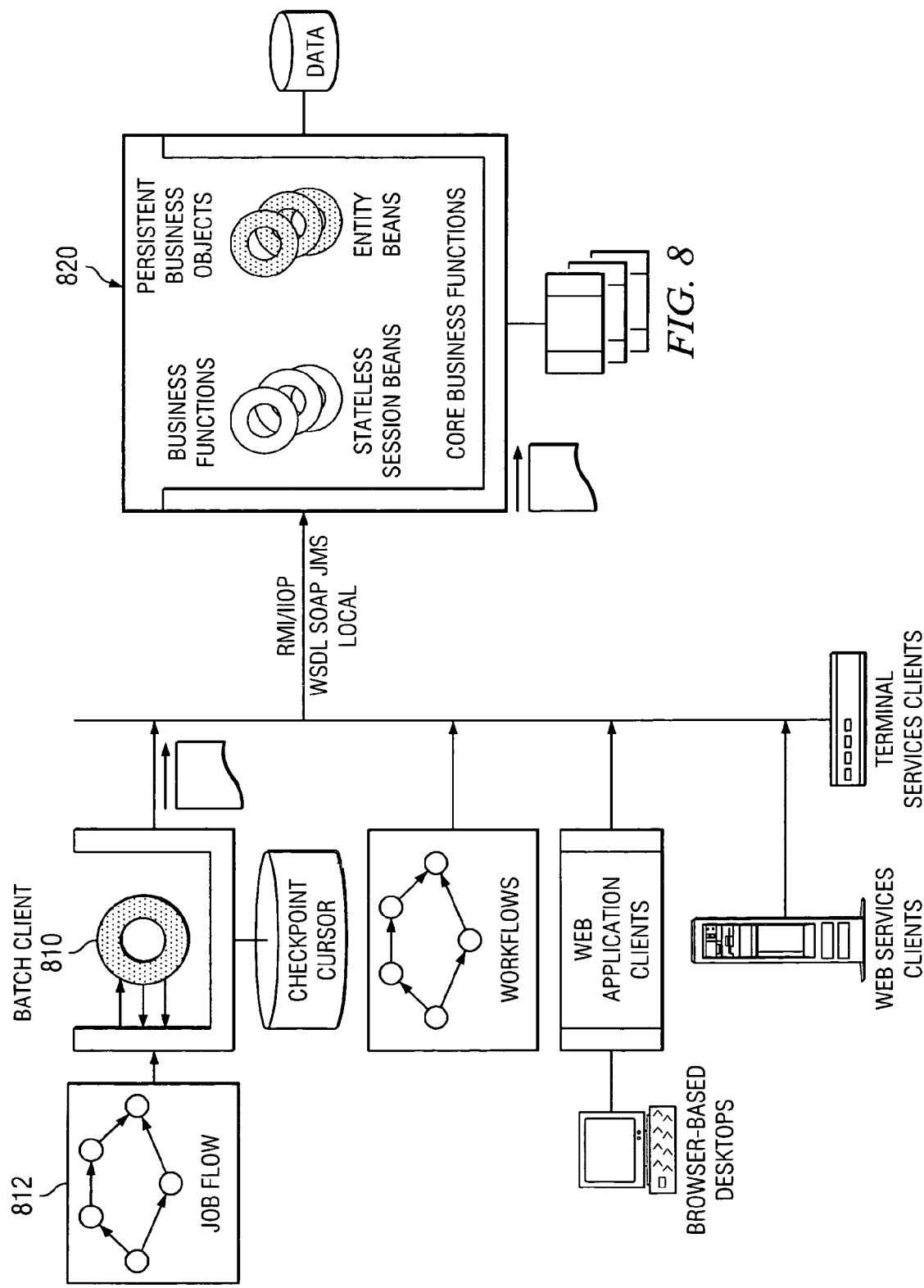
FIG. 8 is a block diagram illustrating a batch component model used within a distributed object environment with a job scheduler in accordance with an exemplary embodiment of the present invention.

FIG. 8 is a block diagram illustrating a batch component model used within a distributed object environment with a job scheduler in accordance with an exemplary embodiment of the present invention. The distributed object environment may be implemented in J2EE as a combination of SessionBeans and EntityBeans. Core business functions 820 include business functions, which may be stateless SessionBeans, and persistent business objects, which may be EntityBeans. Batch client 810 accesses the same core business functions 820 as the other clients in the distributed object environment.

Since the BatchBean in batch client 810 is a component, its operations can be called by other clients to begin the batch task. One such client may be a scheduling program—a facility for initiating batch jobs at a certain time of day or in response to certain information arriving at the enterprise, such as a dataset containing bank checks that were received form a member bank, for example. The scheduler may initiate a sequence of batch jobs to make up job flow 812.

Figure 9:
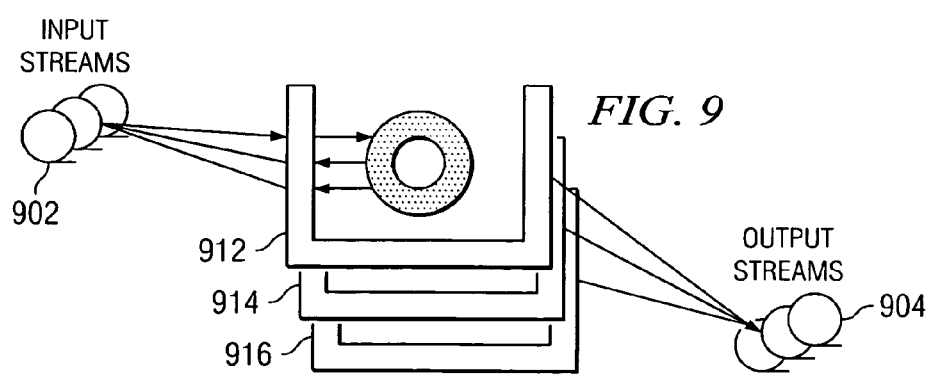
FIG. 9 illustrates a plurality of batch jobs that make up a job flow in accordance with an exemplary embodiment of the present invention.

FIG. 9 illustrates a plurality of batch jobs that make up a job flow in accordance with an exemplary embodiment of the present invention. Batch jobs 912, 914, 916 receive input streams 902 and produce output streams 904. Batch jobs 912-916 may be executed serially. That is batch job 914 runs at the completion of batch job 912 and batch job 916 runs at the completion of batch job 914. In another implementation, batch jobs 912-916 may be run in parallel where batch jobs 912-916 begin at the same time and run concurrently. Alternatively, batch jobs 912-916 may be staggered—timed to begin after a certain amount of processing has occurred in another batch job.

Furthermore, the output stream produced by one batch job may serve as an input stream to another batch job. In this manner, the job flow may be structured as a data flow. Moreover, some batch jobs may never terminate; rather, they just continue to process from their input streams that, in turn, may be fed from other batch jobs, and so forth. Other batch jobs may be scheduled to regularly process a portion of their input streams. For example, a batch job may be scheduled to start every ten minutes and process a thousand input records, just chipping away at the input at a very deterministic rate and generating very predictable demands on the information system.

Each batch container is able to restart a batch job, either as a result of a failure that occurred in a previous run of the batch job or as a result of deliberately starting and stopping the batch job. Consequently, the container may be able to tell the batch component where to begin work—where within the input stream the BatchBean should start reading again. Likewise, the container must be able to instruct the BatchBean on where to stop processing—either as a result of a portion of the batch job timing out or as a result of an administrator deliberately stopping or suspending the batch job. This same mechanism can also be used to schedule multiple instances of the batch job running—each starting from a different position within the input stream and continuing to a different stopping point. In this way, a large batch job can be partitioned and executed in parallel—perhaps in different containers or on different computers—as a way of spreading the workload and enabling concurrent processing.

Batch partitioning may be performed by either directing each job partition to share the same input and output streams or by partitioning the input streams and distributing those to each of the batch job partitions and likewise re-assembling the disparate output streams that each partition produces.

The scheduler can distribute batch jobs and partitions to run on different computers in the network. The scheduler can make scheduling (time and location) decisions based on the actual utilization and capacity of different computers in the network, based on where input and output resources are located, and where execution demands are least likely to be impacted by the batch job (or vice versa). A key function of the scheduler is to collaborate with the batch container to ensure the needed input and output resources are available (or allocated) to the batch job before it is started—in doing so, it is ensuring that the batch job can be run with maximum efficiency.

Finally, it is the responsibility of the batch container to maintain knowledge of what batch jobs are running and which are suspended or waiting to be scheduled or dispatched. It should be possible for an administrator to query the container for this information to get an idea of how much of each batch has been completed or how close it is to completing all of its work.

Figure 10:
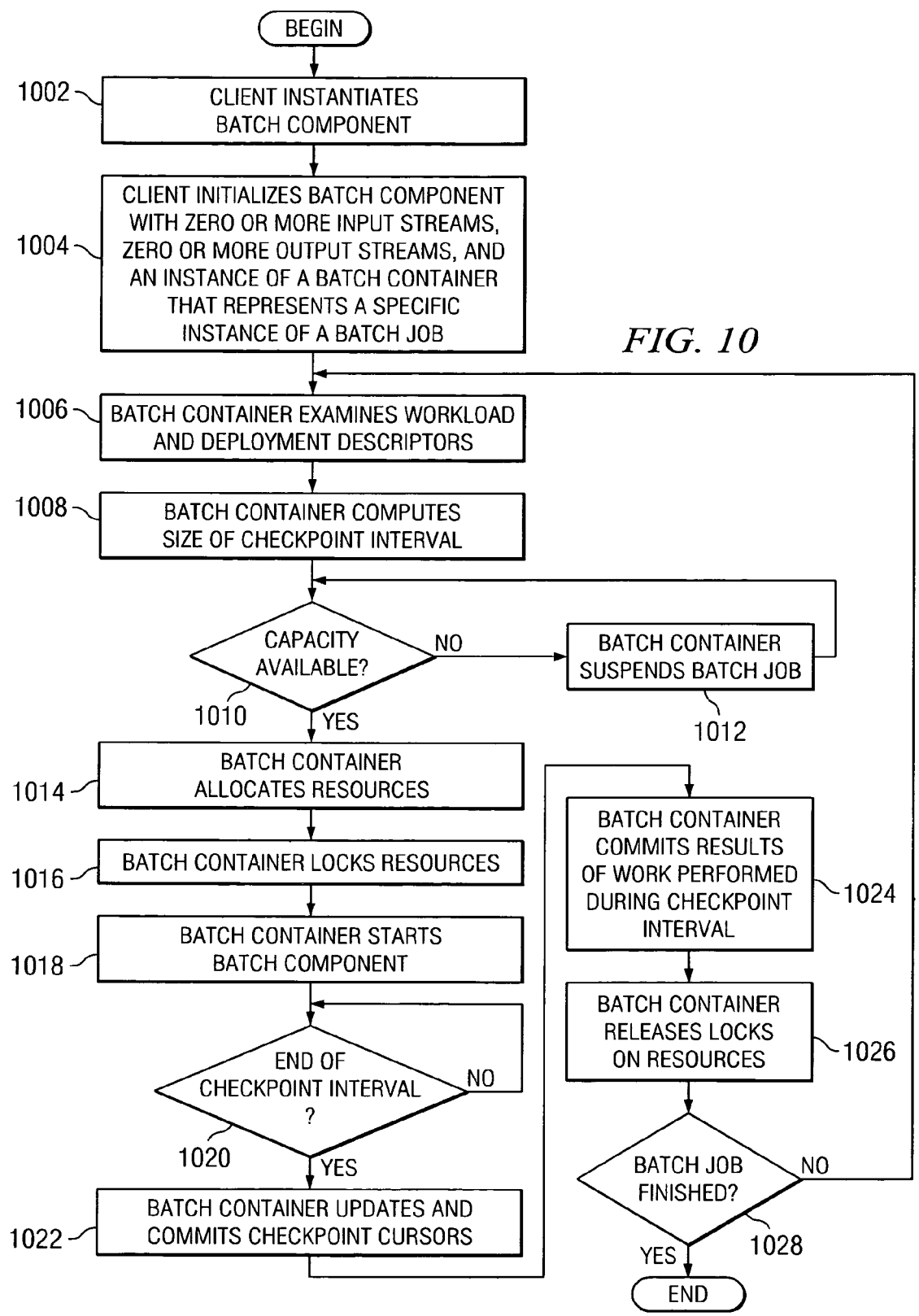
FIG. 10 is a flowchart illustrating the operation of a batch component model within a distributed object environment in accordance with an exemplary embodiment of the present invention.

FIG. 10 is a flowchart illustrating the operation of a batch component model within a distributed object environment in accordance with an exemplary embodiment of the present invention. The process begins and the client instantiates a batch component (block 1002). The client initializes the batch component with zero or more input streams, zero or more output streams, and an instance of a batch container that represents a specific instance of a batch job (block 1004).

A client may deploy different instances of the same batch component by instantiating the batch component with different instances of a batch container and providing different deployment descriptors. The deployment descriptors identify which business function components the batch component uses, the input data streams, and the output data streams. The deployment descriptors also name the batch program, condition the checkpoint interval for the batch job, and enumerate other resource dependencies that should be allocated before beginning the batch job. The batch container uses these deployment descriptors to manage the batch component.

Next, the batch container examines the workload and deployment descriptors (block 1006) and the batch container computes a size of a checkpoint interval (block 1008). The batch checkpoint interval may be determined based on other conditions in the execution environment. Checkpoint intervals may be measured in terms of the number of records processed in the interval or the amount of time spent in the interval. The container may increase the interval when resource contention from other workloads in the distributed object environment is low. The container may decrease the interval when contention is high or when there is an elevated potential for the job to fail and have to be restarted.

A determination is made as to whether resource capacity is available for the batch job (block 1010). If resource capacity is not available, the batch container suspends the batch job (block 1012) and the process returns to block 1010. The batch component remains suspended until the necessary resource capacity is available for the batch job in block 1010.

If the necessary resource capacity is available in block 1010, the batch container allocates resources for the batch job (block 1014) and the batch container locks the resources (block 1016). Then, the batch container starts the batch component (block 1018). A determination is made as to whether the end of the checkpoint interval is reached (block 1020). If the end of the checkpoint interval is not reached, the process returns to block 1020 and the batch component continues processing until the end of the checkpoint interval is reached.

If the end of the checkpoint interval is reached in block 1020, the batch container updates and commits checkpoint cursors that mark the progress of the batch job through its input and output streams (block 1022). Thereafter, the batch container commits the results of the work performed during the checkpoint interval (block 1024) and the batch container releases the locks on the resources (block 1026).

A determination is then made as to whether the batch job is finished (block 1028). If the batch job is finished, the process ends. However, if the batch job is not finished in block 1028, the process returns to block 1006 where the batch container examines the workload and deployment descriptors for the next checkpoint interval.

Figure 11:
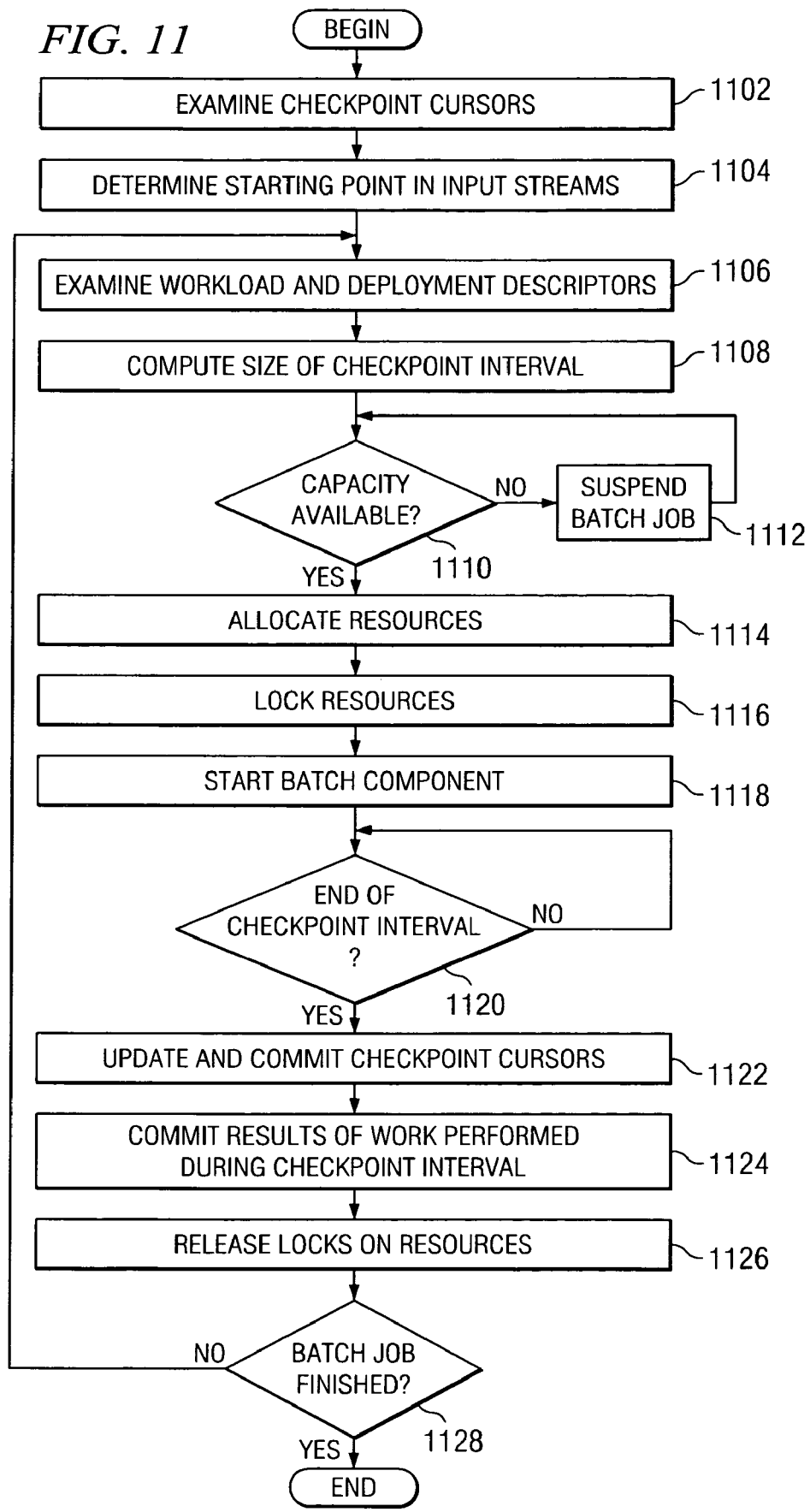
FIG. 11 is a flowchart illustrating the operation of a batch container restarting a batch job in accordance with an exemplary embodiment of the present invention.

FIG. 11 is a flowchart illustrating the operation of a batch container restarting a batch job in accordance with an exemplary embodiment of the present invention. The batch container may restart the batch job responsive to the batch job failing, such as failure to commit results or the like, or being suspended or terminated by an administrator. The process begins and examines the checkpoint cursors (block 1102). The process then determines the starting point in the input streams (block 1104).

Next, the process examines workload and deployment descriptors (block 1106) and computes a size of a checkpoint interval (block 1108). The checkpoint interval may be determined based on other conditions in the execution environment. Checkpoint intervals may be measured in terms of the number of records processed in the interval or the amount of time spent in the interval.

A determination is made as to whether resource capacity is available for the batch job (block 1110). If resource capacity is not available, the process suspends the batch job (block 1112) and the process returns to block 1110. The batch component remains suspended until the necessary resource capacity is available for the batch job in block 1110.

If the necessary resource capacity is available in block 1110, the process allocates resources for the batch job (block 1114) and locks the resources (block 1116). Then, the process starts the batch component (block 1118). A determination is made as to whether the end of the checkpoint interval is reached (block 1120). If the end of the checkpoint interval is not reached, the process returns to block 1120 and the batch component continues processing until the end of the checkpoint interval is reached.

If the end of the checkpoint interval is reached in block 1120, the process updates and commits checkpoint cursors that mark the progress of the batch job through its input and output streams (block 1122). Thereafter, the process commits the results of the work performed during the checkpoint interval (block 1124) and releases the locks on the resources (block 1126).

A determination is then made as to whether the batch job is finished (block 1128). If the batch job is finished, the process ends. However, if the batch job is not finished in block 1128, the process returns to block 1106 to examine the workload and deployment descriptors for the next checkpoint interval.

Thus, the present invention solves the disadvantages of the prior art by providing a component model for batch computing in a distributed object environment. The batch component is managed by a batch container that may dynamically set a checkpoint interval based on deployment descriptors associated with the batch component and other workloads being served in the execution environment at the same time. Thus, the batch container enforces the policies in the deployment descriptors of the batch component while ensuring continuous service of concurrent online transaction processing workloads. Checkpoint conditions are isolated so that the checkpoint interval can be varied form one run to the next or even within a single run based on actual workload conditions of the hosting environment.

The batch component model also captures the same separation of concerns between business logic and information system infrastructure that are the principle merits of component-based programming. Furthermore, input streams and output streams are abstractions of the actual underlying data technology from which those streams receive their data. The batch component of the present invention is also able to share business logic and data components with online transaction processing.

The container can also be queried by an administrator to identify which jobs are running, suspended, scheduled, or waiting to be dispatched. The container also allows an administrator to perform operations on the batch job to start the program, interrupt the program, recover from failure, or to restart the program.

Furthermore, batch components may be related so that one batch job can be scheduled after the completion of another batch job. Batch jobs may also be interconnected so that output of one batch job may become input to another batch job.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of batch processing in a batch component model within a distributed object environment, the computer-implemented method comprising:
    instantiating a batch component by a processor of a data processing system, for use with a batch job within the distributed object environment;
    initializing the batch component with a set of deployment descriptors and an instance of a batch container to form a contractual relationship between the batch component and the batch container, wherein the set of deployment descriptors is a set of declarative policies for the batch component;
    wrapping the contractual relationship between the batch component and the batch container to form an adapter, wherein the adapter isolates the batch component from different implementations of the batch container;
    dynamically computing by the batch container, for each use of a checkpoint interval, a size of the checkpoint interval for the batch job based on the set of deployment descriptors and other processing workloads;
    managing operation of the batch component in the batch component model by the batch container in accordance with the set of deployment descriptors and the other processing workloads; and
    committing, by the batch container on the processor, at an end of the checkpoint interval, checkpoint cursors and data of the batch job that are updated during the batch processing to a storage of the data processing system, wherein context information, including the size of the checkpoint interval and resource dependencies, is persisted and passed to downstream batch containers.

2. The computer-implemented method of claim 1, wherein the set of deployment descriptors identify at least one of one or more input stream components and one or more output stream components.

3. The computer-implemented method of claim 2, wherein the one or more input stream components are abstractions of actual underlying data technology from which the one or more input stream components receive data.

4. The computer-implemented method of claim 1, further comprising computing the size of the checkpoint interval by the batch container based on a number of records in the checkpoint interval.

5. The computer-implemented method of claim 2, wherein the one or more output stream components are abstractions of actual underlying data technology to which the one or more output stream components send data.

6. The computer-implemented method of claim 1, further comprising:
    determining, by the batch container, whether a resource capacity is available to process the batch job; and
    responsive to the resource capacity being unavailable, suspending the batch job by the batch container until the resource capacity becomes available.

7. The computer-implemented method of claim 1, wherein the set of deployment descriptors includes descriptors for identifying business function components, symbolic references resolved at deployment time, for conditioning a checkpoint interval and enumerating resource dependencies identify resources that are needed for the batch job.

8. The computer-implemented method of claim 7, wherein managing operation of the batch component includes allocating, by the batch container, at least a portion of the resources for at least a portion of the batch job.

9. The computer-implemented method of claim 8, wherein managing operation of the batch component further includes locking, by the batch container, at least a portion of the resources required by the batch job.

10. The computer-implemented method of claim 1, wherein managing operation of the batch component includes checkpointing periodically, by the batch container, a progress of the batch job; and persisting, by storing in a checkpoint cursor storage, any cursors that mark the progress of the batch job, wherein an administrator is capable of querying the checkpoint cursor storage.

11. The computer-implemented method of claim 1, wherein the batch component shares business logic and data components within the distributed object environment with other batch jobs or online transaction processing components.

12. A computer-implemented method of batch processing with a batch container of a batch component model in a distributed object environment, the computer-implemented method comprising:
    forming a contractual relationship between a batch component and the batch container;
    wrapping the contractual relationship between the batch component and the batch container to form an adapter, wherein the adapter isolates the batch component from different implementations of the batch container;
    computing, by the batch container on a processor of a data processing system, for each use of a checkpoint interval, a size of the checkpoint interval for a batch component of a batch job based on a set of deployment descriptors and other processing workloads, wherein the set of deployment descriptors is a set of declarative policies for the batch component;

running the batch component within the checkpoint interval, by the processor; and upon completion of the checkpoint interval, committing by the batch container, data updated during the checkpoint interval and at least one checkpoint cursor to a storage of the data processing system, wherein context information, including the size of the checkpoint interval and resource dependencies, is persisted and passed to downstream batch containers.

13. The computer-implemented method of claim 12, further comprising:

increasing, by the batch container, the size of the checkpoint interval when contention for resources to run the batch job is low.

14. The computer-implemented method of claim 13, further comprising:

stopping the batch component by the batch container during a given checkpoint interval; and responsive to the batch component stopping during a given checkpoint interval, determining by the batch container a starting point based on the at least one checkpoint cursor and restarting the batch component at the starting point.

15. The computer-implemented method of claim 12, further comprising:

responsive to a failure of the batch container to commit data, rolling back the batch job to a prior checkpoint by the batch container.

16. The computer-implemented method of claim 12, further comprising:

before running the batch component within the checkpoint interval, allocating resources to be used by the batch component during the checkpoint interval and locking the resources by the batch container.

17. The computer-implemented method of claim 16, further comprising:

upon completion of the checkpoint interval duration, unlocking the resources by the batch container.

18. The computer-implemented method of claim 12, further comprising:

restarting the batch job, by the batch container, responsive to a failure to commit.

19. The computer-implemented method of claim 12, further comprising:

upon completion of the checkpoint interval duration, determining by the batch container the size of the checkpoint interval for a next checkpoint interval.

20. The computer-implemented method of claim 12, wherein a duration of the checkpoint interval is determined by the batch container based on a number of records in an input data stream.

21. The computer-implemented method of claim 12, wherein the checkpoint interval is determined by the batch container based on actual workload conditions of the distributed object environment.

22. A computer-implemented method of batch processing a batch job in a batch component model using a batch container, the computer-implemented method comprising:

dividing, by the batch container on a processor of a data processing system, an input stream into a plurality of batch job partitions of the input stream, to form a contractual relationship between each batch component and the batch container;

wrapping the contractual relationship between each batch component and the batch container to form an adapter, wherein the adapter isolates each batch component from different implementations of the batch container;

computing, by the batch container, on the processor, for each use of a checkpoint interval, a size of the checkpoint interval for a batch component of a batch job using a set of deployment descriptors and other processing workloads, wherein the set of deployment descriptors is a set of declarative policies for the batch component, and wherein context information, including the size of the checkpoint interval and resource dependencies, is persisted and passed to downstream batch containers;

running, through a distribution of a scheduler, a plurality of instances of a batch component, by the batch container, within the checkpoint interval, wherein each instance of the batch component within the plurality of instances of the batch component operates on a respective batch job partition of the input stream to produce a separate output stream; and assembling the separate output streams produced by each respective batch job partition.

23. The computer-implemented method of claim 22, wherein the plurality of instances of the batch component operate in parallel.

24. The computer-implemented method of claim 22, wherein a second instance of the batch component begins operation at completion of operation of a first instance of the batch component.

25. The computer-implemented method of claim 22, wherein initiation of the plurality of instances of the batch component is staggered by the batch container.

26. An apparatus for batch processing in a batch component model within a distributed object environment, the apparatus comprising:

a system bus;

a local memory in communication with the system bus, wherein the local memory contains computer executable instructions;

a processor connected to the system bus, wherein the processor executes the computer executable instructions to:

instantiate a batch component on a processor of a data processing system, for use with a batch job within the distributed object;

initialize the batch component with a set of deployment descriptors and an instance of a batch container environment to form a contractual relationship between the batch component and the batch container, wherein the set of deployment descriptors is a set of declarative policies for the batch component;

wrap the contractual relationship between the batch component and the batch container to form an adapter, wherein the adapter isolates the batch component from different implementations of the batch container;

dynamically compute by the batch container a size of a checkpoint interval for the batch job using the set of deployment descriptors and other processing workloads, for each use of the checkpoint interval;

manage operation of the batch component in the batch component model within the distributed object environment in accordance with the set of deployment descriptors and the other processing workloads by the batch container; and commit by the batch container checkpoint cursors and data of the batch job that are updated during the batch processing to a storage of the a data processing system on completion of the checkpoint interval, wherein context information, including the size of the checkpoint interval and resource dependencies is persisted and passed to downstream batch containers.

27. The apparatus of claim 26, wherein the set of deployment descriptors identify one or more input stream components.

28. The apparatus of claim 27, wherein the one or more input stream components are abstractions of actual underlying data technology from which the one or more input stream components receive data.

29. The apparatus of claim 26, wherein the set of deployment descriptors identify one or more output stream components.

30. The apparatus of claim 27, wherein the one or more output stream components are abstractions of actual underlying data technology to which the one or more output stream components send data.

31. The apparatus of claim 26, wherein the set of deployment descriptors identify at least one business function component that the batch component uses.

32. The apparatus of claim 26, wherein the set of deployment descriptors identify resources that are needed for the batch job and include descriptors for identifying business function components, symbolic references resolved at deployment time, for conditioning a checkpoint interval and enumerating resource dependencies.

33. The apparatus of claim 32, wherein the processor further executes the computer executable instructions to allocate by the batch container at least a portion of the resources for at least a portion of the batch job.

34. The apparatus of claim 33, wherein the processor further executes the computer executable instructions to lock by the batch container at least a portion of the resources required by the batch job.

35. The apparatus of claim 26, wherein the processor further executes the computer executable instructions to checkpoint progress of the batch job periodically by the batch container.

36. The apparatus of claim 26, wherein the batch component shares business logic and data components within the distributed object environment with other batch jobs or online transaction processing components.

37. The apparatus of claim 26, wherein the processor further executes the computer executable instructions to:
determine a duration of the checkpoint interval for a batch component by the batch container;
execute the batch component within the checkpoint interval by the batch container; and
store at least one checkpoint cursor upon completion of the checkpoint interval duration by the batch container.

38. The apparatus of claim 37, wherein the processor further executes the computer executable instructions to:
commit the at least one checkpoint cursor by the batch container upon completion of the duration of the checkpoint interval.

39. The apparatus of claim 38, wherein the processor further executes the computer executable instructions to:
determine a starting point based on the at least one checkpoint cursor and restart the batch component at the starting point by the batch container, responsive to the batch component stopping during a given checkpoint interval.

40. The apparatus of claim 37, wherein the processor further executes the computer executable instructions to:
commit, by the batch container, transactional updates that occurred during the checkpoint interval upon completion of the duration of the checkpoint interval.

41. The apparatus of claim 37, wherein the processor further executes the computer executable instructions to:
allocate resources by the batch container to be used by the batch component during the checkpoint interval; and
lock the resources by the batch container before running the batch component within the checkpoint interval.

42. The apparatus of claim 41, wherein the processor further executes the computer executable instructions to:
unlock the resources by the batch container upon completion of the duration of the checkpoint interval.

43. The apparatus of claim 37, wherein the processor further executes the computer executable instructions to:
receive a set of deployment descriptors for the batch component by the batch container; and
determine the duration of the checkpoint interval by the batch container using the deployment descriptors and the other processing workloads.

44. The apparatus of claim 37, wherein the processor further executes the computer executable instructions to:
determine the size of the checkpoint interval by the batch container for a next checkpoint interval upon completion of the duration of the checkpoint interval.

45. The apparatus of claim 37, wherein the duration of the checkpoint interval is one of a period of time and a number of records in an input data stream.

46. The apparatus of claim 37, wherein the checkpoint interval is determined by the batch container based on actual processing workloads of the distributed object environment.

47. The apparatus of claim 26, wherein the processor executes the computer executable instructions to:
partition a batch job by the batch container;
divide an input stream into a plurality of partitions of the input stream by the batch container; and
execute a plurality of instances of the batch component, wherein each instance of the batch component within the plurality of instances of the batch component operates on a respective partition of the input stream.

48. The apparatus of claim 47, wherein the plurality of instances of the batch component operate in parallel.

49. The apparatus of claim 47, wherein a second instance of the batch component begins operation at completion of operation of a first instance of the batch component.

50. The apparatus of claim 47, wherein initiation of the plurality of instances of the batch component by the batch container is staggered.

51. The apparatus of claim 26, wherein the processor executes the computer executable instructions to receive a query in the batch container from an administrator and return information by the batch container about progress of the batch job to the administrator.

52. The apparatus of claim 26, further comprising:
business function components; and
business object components.

53. The apparatus of claim 52, wherein the business function components are stateless session beans and wherein the business object components are entity beans.

54. The apparatus of claim 52, further comprising:
at least one online processing client that performs operations using the business function components and the business object components in real time.

55. The apparatus of claim 54, wherein the batch component shares the business function components and the business object components with the at least one online processing client.

56. The apparatus of claim 54, wherein the at least one online processing client includes at least one of a terminal services client, a Web services client, a Web application client, and a workflow.

57. A computer program product, for batch processing in a batch component model within a distributed object environment, the computer program product comprising:

a computer readable recordable type media having computer executable instructions stored thereon, the computer executable instructions comprising:

computer executable instructions for instantiating a batch component for use with a batch job within the distributed object environment;

computer executable instructions for initializing the batch component with a set of deployment descriptors and an instance of a batch container to form a contractual relationship between the batch component and the batch container, wherein the set of deployment descriptors is a set of declarative policies for the batch component;

computer executable instructions for wrapping the contractual relationship between the batch component and the batch container to form an adapter, wherein the adapter isolates the batch component from different implementations of the batch container;

computer executable instructions for dynamically computing, by the batch container, a size of a checkpoint interval for the batch job using the set of deployment descriptors and other processing workloads, for each use of the checkpoint interval;

computer executable instructions for managing operation of the batch component within the distributed object environment by the batch container in accordance with the set of deployment descriptors and the other processing workloads; and computer executable instructions for committing by the batch container on completion of the checkpoint interval, checkpoint cursors and data of the batch job that are updated during the batch processing to a storage of a data processing system, wherein context information including the size of the checkpoint interval and resource dependencies is persisted and passed to downstream batch containers.

58. The computer program product, of claim 57, wherein computer executable instructions for managing operation of the batch component further comprises:

computer executable instructions for checkpointing a batch job in a distributed object environment by the batch container;

computer executable instructions for determining a duration of a checkpoint interval for the batch component by the batch container;

computer executable instructions for running the batch component within the checkpoint interval by the batch container; and computer executable instructions for storing at least one checkpoint cursor upon completion of the checkpoint interval duration by the batch container.

59. The computer program product of claim 57, wherein computer executable instructions for instantiating a batch component further comprises:

computer executable instructions for partitioning the batch job by the batch container;

computer executable instructions for dividing an input stream into a plurality of partitions of the input stream by the batch container; and computer executable instructions for running a plurality of instances of the batch component by the batch container, wherein each instance of the batch component within the plurality of instances of the batch component operates on a respective partition of the input stream.

* * * * *